United States Patent
Steen

(10) Patent No.: US 10,823,014 B2
(45) Date of Patent: Nov. 3, 2020

(54) TURBINE ENGINE FOR REDUCING ROTOR BOW AND METHOD THEREOF

(71) Applicant: General Electric Company, Schenectady, NY (US)

(72) Inventor: Tod Robert Steen, Evendale, OH (US)

(73) Assignee: General Electric Company, Schenectady, NY (US)

(*) Notice: Subject to any disclaimer, the term of this patent is extended or adjusted under 35 U.S.C. 154(b) by 248 days.

(21) Appl. No.: 15/840,071

(22) Filed: Dec. 13, 2017

(65) Prior Publication Data

US 2019/0178108 A1 Jun. 13, 2019

(51) Int. Cl.
| | |
|---|---|
| *F01D 25/36* | (2006.01) |
| *F02C 3/04* | (2006.01) |
| *F02C 7/32* | (2006.01) |
| *F02C 7/268* | (2006.01) |
| *F16C 1/02* | (2006.01) |

(52) U.S. Cl.
CPC .............. *F01D 25/36* (2013.01); *F02C 3/04* (2013.01); *F02C 7/268* (2013.01); *F02C 7/32* (2013.01); *F16C 1/02* (2013.01); *F05D 2220/32* (2013.01); *F05D 2240/62* (2013.01); *F05D 2260/402* (2013.01); *F05D 2270/114* (2013.01)

(58) Field of Classification Search
CPC .. F02C 7/268; F02C 7/275; F02C 7/32; F02C 7/36; F01D 25/34; F01D 25/36; F01D 21/00; F01D 15/10; F05D 2240/62; F05D 2270/114; F05D 2260/402

See application file for complete search history.

(56) References Cited

U.S. PATENT DOCUMENTS

| | | | |
|---|---|---|---|
| 3,793,905 A | 2/1974 | Black et al. | |
| 4,733,529 A | 3/1988 | Nelson et al. | |
| 4,854,120 A | 8/1989 | Nelson et al. | |
| 5,136,837 A * | 8/1992 | Davison | F02C 6/08 60/39.183 |
| 5,813,829 A | 9/1998 | Mazzotta | |
| 7,309,208 B2 * | 12/2007 | Hansen | F01D 25/36 415/123 |
| 7,805,947 B2 | 10/2010 | Moulebhar | |
| 7,866,234 B2 * | 1/2011 | Smart | F01D 25/36 73/112.01 |
| 8,419,351 B2 * | 4/2013 | Richards | F02C 7/36 415/118 |
| 9,027,355 B2 | 5/2015 | Colotte et al. | |
| 9,664,070 B1 * | 5/2017 | Clauson | F01D 25/36 |
| 10,260,369 B2 * | 4/2019 | Unna | F01D 21/003 |
| 2006/0188372 A1 * | 8/2006 | Hansen | F01D 25/36 416/169 R |
| 2007/0031242 A1 * | 2/2007 | Colonna | F01D 21/003 415/121.3 |

(Continued)

FOREIGN PATENT DOCUMENTS

GB 2394523 A * 4/2004 ............. F01D 25/36

*Primary Examiner* — Alain Chau
(74) *Attorney, Agent, or Firm* — Dority & Manning, P.A.

(57) ABSTRACT

The present disclosure provides a turbine engine, comprising a core turbine engine comprising a turbine and a compressor adapted to be driven by the turbine via a rotor; as accessory gearbox connected with the rotor; and a flexible shaft having a first end connected with the accessory gearbox and a second end extending toward outside for being coupled to an external power source.

20 Claims, 4 Drawing Sheets

(56) References Cited

U.S. PATENT DOCUMENTS

| | | | | |
|---|---|---|---|---|
| 2007/0130767 A1* | 6/2007 | McCooey | ............... | F01D 25/34 29/889.2 |
| 2009/0044665 A1* | 2/2009 | Smart | .................... | F01D 25/34 81/52 |
| 2010/0189548 A1* | 7/2010 | Richards | ................... | F02C 7/36 415/123 |
| 2013/0167375 A1* | 7/2013 | Roesing | ................. | F01D 5/005 29/888.3 |
| 2014/0318144 A1* | 10/2014 | Lazzeri | .................. | F01D 21/18 60/772 |
| 2015/0369132 A1* | 12/2015 | Roberge | ................. | F01D 25/28 415/124.1 |
| 2016/0215649 A1* | 7/2016 | Unna | .................... | F01D 25/285 |
| 2016/0348588 A1 | 12/2016 | Ross et al. | | |
| 2017/0363012 A1* | 12/2017 | Clauson | ................. | F01D 21/00 |

* cited by examiner

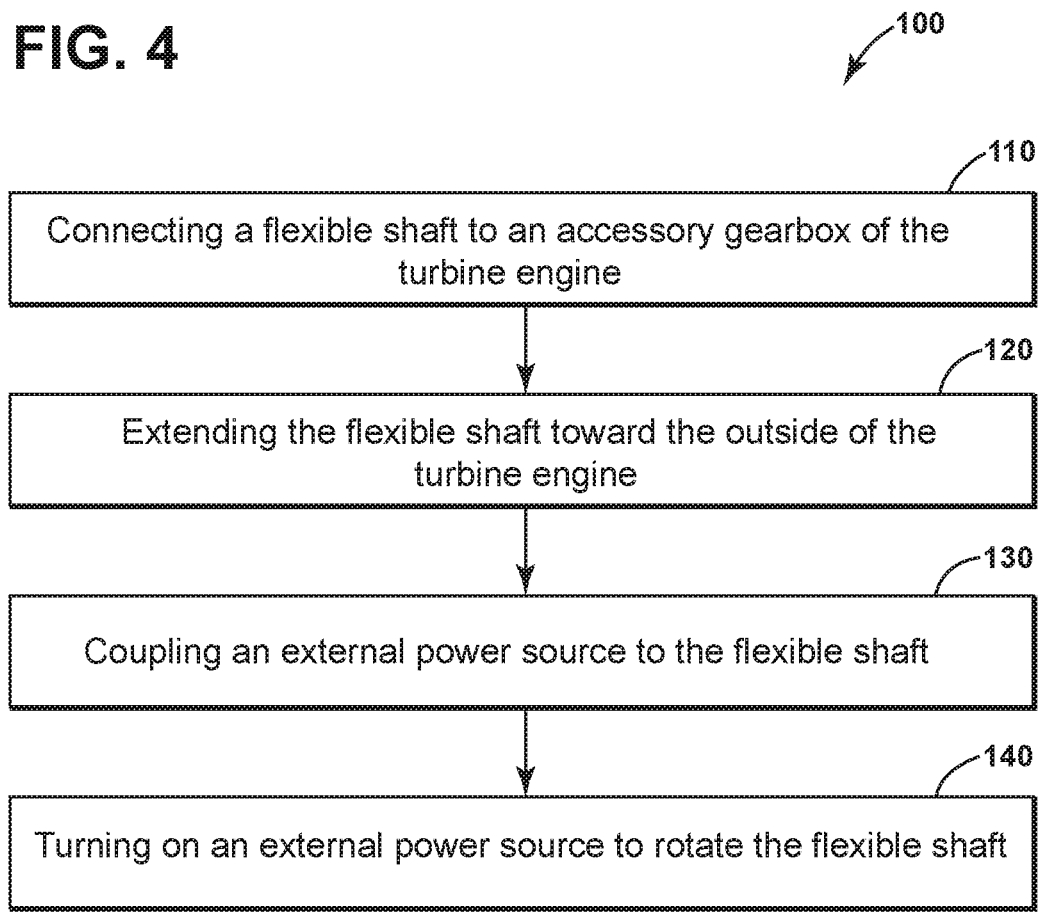

TURBINE ENGINE FOR REDUCING ROTOR BOW AND METHOD THEREOF

BACKGROUND

This disclosure relates generally to an aircraft engine technique, and more particularly to turbine engine and method for reducing rotor bow.

Gas turbine engines, e.g. aircraft turbofan engines, cool unevenly after the engine is shut down. Because of convection and buoyancy effects, the bottom part of the engine cools more quickly than does the top part. The top of the engine may remain hotter than the bottom of the engine for a period of time after shutdown. Owing to thermal expansion of the material, this temperature differential can cause the engine shaft or rotor to become distorted, where typically this distortion is in the form of a rotor bow, usually upwardly, of the engine shaft or rotor. The shaft may become eccentric relative to its axis, taking on an effectively arcuate shape instead of being generally cylindrical. This distortion may become problematic if a start is attempted with an aviation gas turbine engine in this condition. In such instances, the engine shaft or rotor eccentricity may result in rubbing of a rotor blade so as to negatively affect performance of the turbine and may result in vibrations which may be felt in the airplane.

BRIEF DESCRIPTION

In one embodiment, the present disclosure provides a turbine engine, comprising a core turbine engine comprising a turbine and a compressor adapted to be driven by the turbine via a rotor; as accessory gearbox connected with the rotor; and a flexible shaft having a first end connected with the accessory gearbox and a second end extending toward outside for being coupled to an external power source.

In another embodiment, the present disclosure provides a system for reducing rotor bow of a turbine engine, comprising: a flexible shaft having a first end connected with an accessory gearbox of the turbine engine, and a second end extending toward outside of the turbine engine; and an external power source coupled to the flexible shaft so as to drive the accessory gearbox through the flexible shaft.

In another embodiment, the present disclosure provides a method for reducing rotor bow of a turbine engine, comprising: connecting a flexible shaft to an accessory gearbox of the turbine engine; extending the flexible shaft toward the outside of the turbine engine; coupling an external power source to the flexible shaft; and turning on the external power source to rotate the flexible shaft.

DRAWINGS

These and other features, aspects, and advantages of the present disclosure will become better understood when the following detailed description is read with reference to the accompanying drawings in which like characters represent like parts throughout the drawings, wherein:

FIG. 4 is a flow chart of a method of reducing rotor bow of a turbine engine, in accordance with an embodiment of the present disclosure.

DETAILED DESCRIPTION

Embodiments of the present disclosure will be described herein below with reference to the accompanying drawings. In the following description, well-known functions or constructions are not described in detail to avoid obscuring the disclosure in unnecessary detail.

Unless defined otherwise, technical and scientific terms used herein have the same meaning as is commonly understood by one of ordinary skill in the art to which this disclosure belongs. The terms "first," "second," and the like, as used herein do not denote any order, quantity, or importance, but rather are used to distinguish one element from another. Also, the terms "a" and "an" do not denote a limitation of quantity, but rather denote the presence of at least one of the referenced items. The terms such as "front," "back," "bottom," and/or "top," unless otherwise noted, are merely used for convenience of description, and are not limited to any one position or spatial orientation. The term "or" is meant to be inclusive and mean either or all of the listed items. The use of "including," "comprising," or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect.

Figure 1:
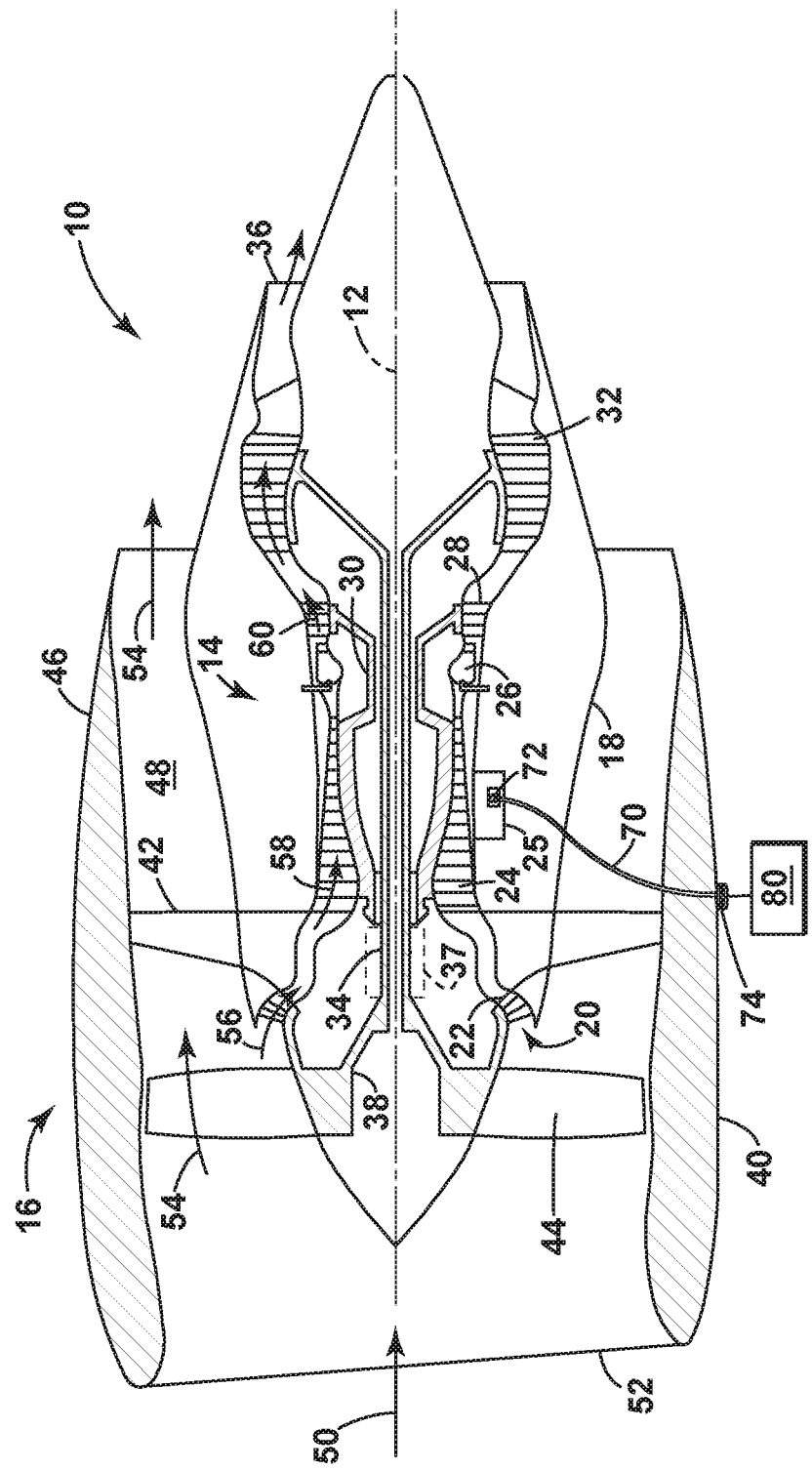
FIG. 1 is a sectional view of a turbine engine, in accordance with an embodiment of the present disclosure.

Referring now to the drawings, FIG. 1 illustrates a cross-sectional view of one embodiment of a gas turbine engine 10 that may be utilized within an aircraft in accordance with aspects of the present subject matter, with the engine 10 being shown having a longitudinal or axial centerline axis 12 extending therethrough for reference purposes. In general, the engine 10 may include a core turbine engine 14 and a fan section 16 positioned upstream thereof. The core turbine engine 14 may generally include a substantially tubular outer casing 18 that defines an annular inlet 20. In addition, the outer casing 18 may further enclose and support a booster compressor 22 for increasing the pressure of the air that enters the core turbine engine 14 to a first pressure level. A high pressure, multi-stage, axial-flow compressor 24 may then receive the pressurized air from the booster compressor 22 and further increase the pressure of such air. The pressurized air exiting the high-pressure compressor 24 may then flow to a combustor 26 within which fuel is injected into the flow of pressurized air, with the resulting mixture being combusted within the combustor 26. The high energy combustion products are directed from the combustor 26 along the hot gas path of the engine 10 to a first (high pressure) turbine 28 for driving the high pressure compressor 24 via a shaft or rotor 30, and then to a second (low pressure) turbine 32 for driving the booster compressor 22 and fan section 16 via a low pressure drive shaft 34 that is generally coaxial with the rotor 30. The "shaft" and "rotor" are substantially interchangeable. After driving each of turbines 28 and 32, the combustion products may be expelled from the core turbine engine 14 via an exhaust nozzle 36 to provide propulsive jet thrust.

Additionally, as shown in FIG. 1, the fan section 16 of the gas turbine engine 10 may generally include a rotatable, axial-flow fan rotor assembly 38 that is configured to be surrounded by a nacelle 40. It should be appreciated by those of ordinary skill in the art that the nacelle 40 may be configured to be supported relative to the core turbine engine 14 by a plurality of substantially radially-extending, circumferentially-spaced outlet guide vanes 42. As such, the nacelle 40 may enclose the fan rotor assembly 38 and its corresponding fan rotor blades 44. Moreover, a downstream section 46 of the nacelle 40 may extend over an outer portion of the core turbine engine 14 so as to define a secondary, or by-pass, airflow conduit 48 that provides additional propulsive jet thrust.

It should be appreciated that, in several embodiments, the low pressure drive shaft 34 may be directly coupled to the fan rotor assembly 38 to provide a direct-drive configuration. Alternatively, the low pressure drive shaft 34 may be coupled to the fan rotor assembly 38 via a speed reduction device 37 (e.g., a reduction gear or gearbox) to provide an indirect-drive or geared drive configuration. Such a speed reduction device(s) may also be provided between any other suitable shafts and/or spools within the engine 10 as desired or required.

During operation of the engine 10, it should be appreciated that an initial air flow (indicated by arrow 50) may enter the engine 10 through an associated inlet 52 of the nacelle 40. The air flow 50 then passes through the fan blades 44 and splits into a first compressed air flow (indicated by arrow 54) that moves through conduit 48 and a second compressed air flow (indicated by arrow 56) which enters the booster compressor 22. The pressure of the second compressed air flow 56 is then increased and enters the high pressure compressor 24 (as indicated by arrow 58). After mixing with fuel and being combusted within the combustor 26, the combustion products 60 exit the combustor 26 and flow through the first turbine 28. Thereafter, the combustion products 60 flow through the second turbine 32 and exit the exhaust nozzle 36 to provide thrust for the engine 10.

In addition, the gas turbine engine 10 may include an accessory gearbox 25 coupled with the rotor 30 to drive the accessories of the gas turbine engine during the engine operation, such as fuel pumps, hydraulic pump, engine starter, etc. Further, the accessory gearbox 25 may be configured at any suitable location in the gas turbine engine 10, but is typically mounted on the inside surface of the nacelle 40 or under the high-pressure compressor 24.

Figure 2:
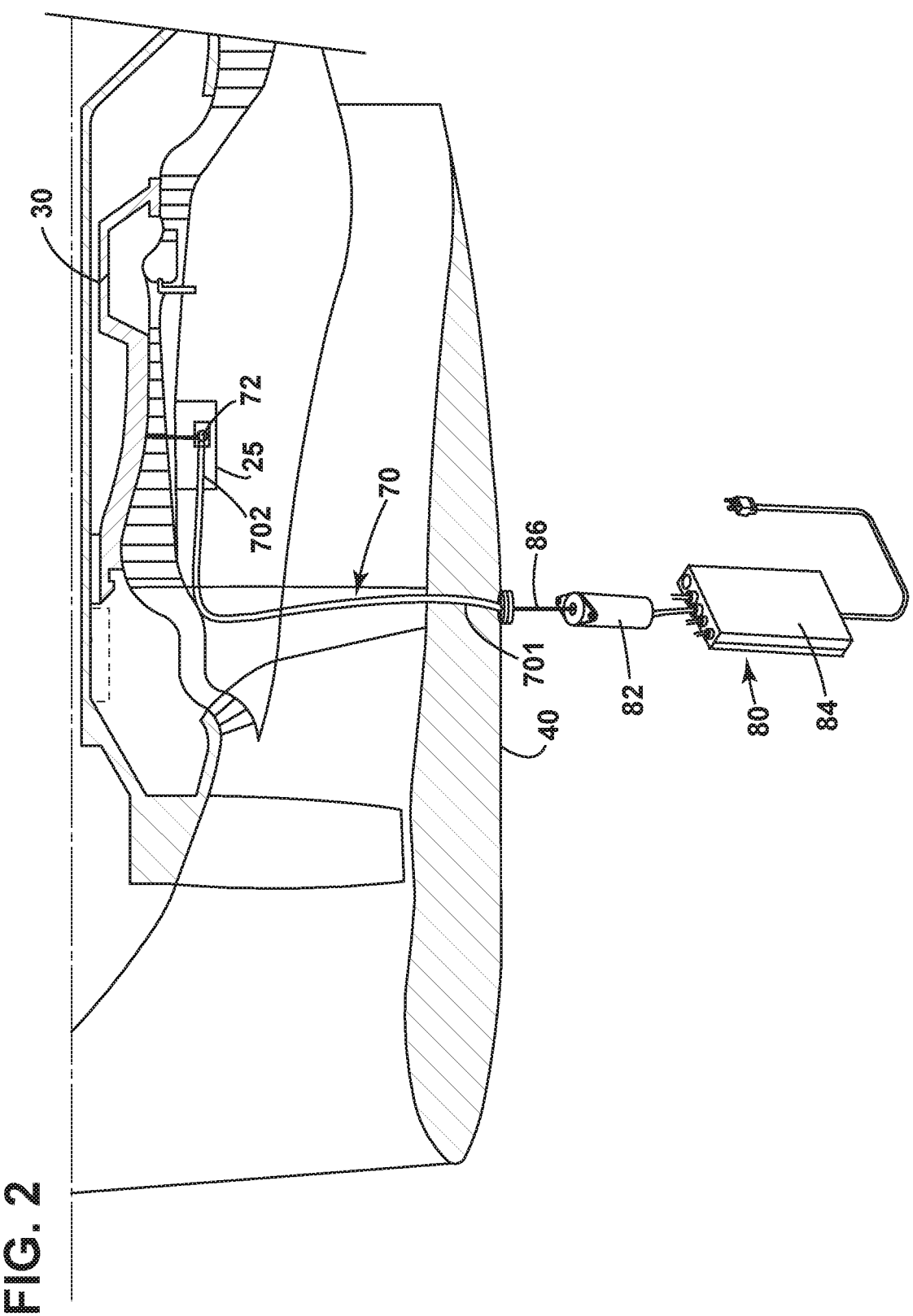
FIG. 2 is a sectional view of a turbine engine, in accordance with another embodiment of the present disclosure.

Referring to FIG. 1 and FIG. 2, the gas turbine engine 10 includes a flexible shaft 70 extending from the accessory gearbox 25 toward outside for ground crew to easily couple an external power source 80 to the flexible shaft 70. The flexible shaft 70 may extend toward outside from the turbine engine to any convenient place for the gourd crew to easily access. In one embodiment, the flexible shaft 70 extending from the accessory gearbox 25 to a nacelle 40 or outside the nacelle, wherein the nacelle covers at least a part of the core engine and the accessory gearbox. The external power source may be a rotary power source including a turning motor, a borescope motor unit or other type of external power source.

After shutdown of the gas turbine engine 10, the ground crew couples the external power source 80 to one end of the flexible shaft 70 on the nacelle to drive the accessory gearbox 25 through the flexible shaft 70. Thus, the rotor 30 of the gas turbine engine 10 also rolls with accessory gearbox 25, so that the rotor 30 can be cooled down evenly so as to reduce the rotor bow or mitigate the distortion of the rotor 30.

The flexible shaft can transmit rotary motion between the accessory gearbox 25 and the external power source 80 which are not fixed relative to one another. The flexible shaft 70 comprises a rotating wire rope or coil which is flexible but has some torsional stiffness. It may or may not have a cover enveloping the flexible rotatable core, which also bends but does not rotate. It may transmit considerable power.

In one embodiment, the flexible shaft 70 comprises a coupler 74 mounted on the nacelle 40, e.g. on an outside surface of the nacelle 40 as shown in FIG. 1, for coupling the flexible shaft 70 and the external power source. The coupler 74 is capable of being coupled to the external power source temporally by the ground crew, when aircraft is stopping at the gate. In another embodiment, the flexible shaft 70 comprises an end thereof extending to outside the nacelle 40. The external power source 80 may be borescope motor unit in one example or other types of external motor with enough durability. In one example, the external power source 80 may directly couple to the flexible shaft 70. In another example, the external power source may have a length of flexible shaft extension 86 extended therefrom that can plug into the coupler 74 to connect with one end of the flexible shaft 70, so as to rotate the flexible shaft 70.

Figure 3:
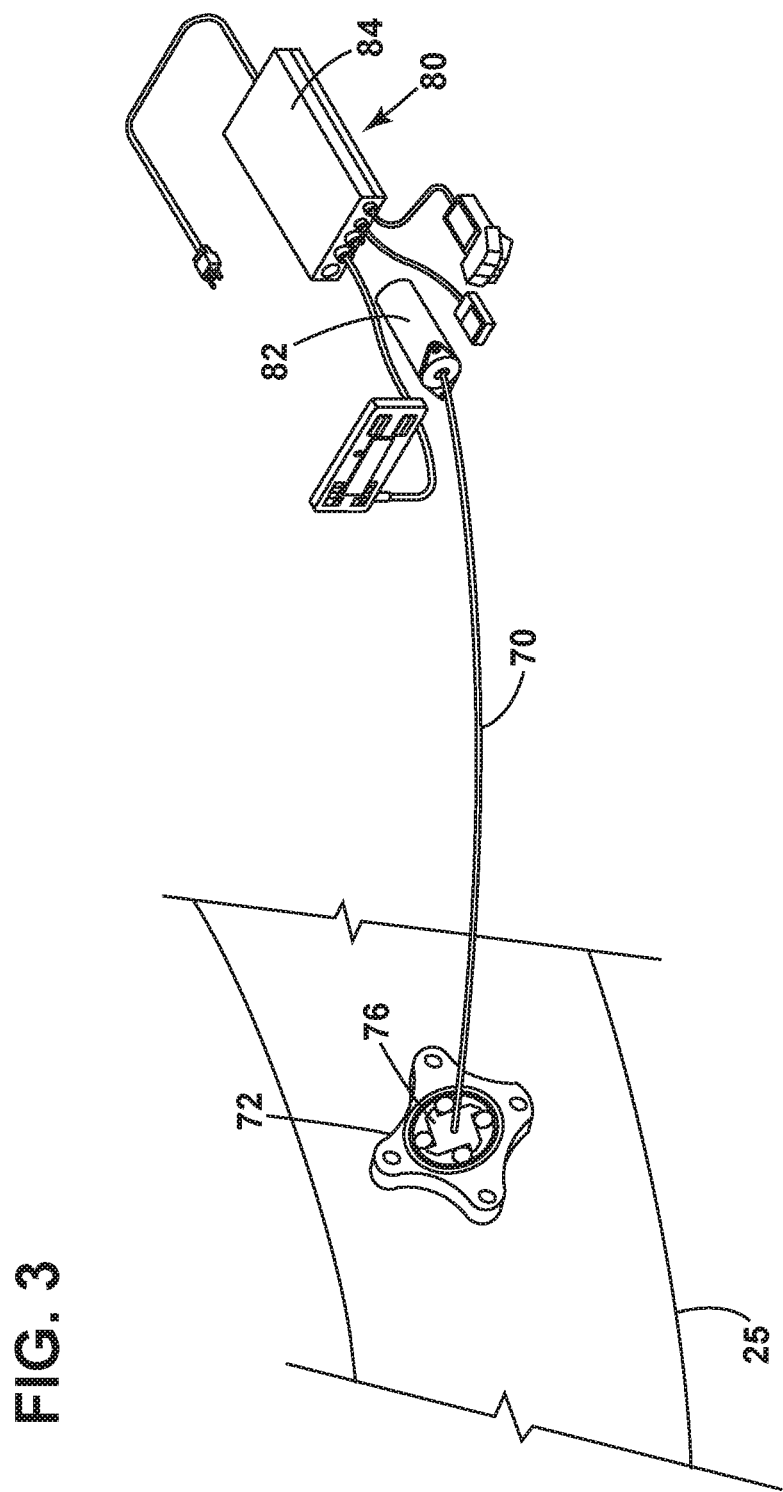
FIG. 3 is an illustrative view of a turbine engine with a one-way clutch, in accordance with another embodiment of the present disclosure.

On the other end, the flexible shaft 70 may connect to a connector 72 of the accessory gearbox 25 to turn the core of the accessory gearbox 25. In one example, the connector 72 is the borescope pad of the accessory gearbox 25. In another example, the connector 72 on the accessory gearbox 25 is a point designed specifically for connecting the flexible shaft 70. The specific point would generally be used if this feature is preplanned. The borescope pad would usually be used if there is no specific point is predesigned. The Flexible shaft 70 may connect directly to the connector 72 on the accessory gearbox 25 such as the borescope pad or the specific point. In another embodiment, the Flexible shaft 70 connects to the connector 72 via a one-way clutch 76 as shown in FIG. 3. The flexible shaft 70 connects to a one-way clutch 76 which is connected to the accessory gearbox 25 so that, when the turbine engine was operating, the flexible shaft does not turn. When the turbine engine is shut down and a torque is applied from the outside by the external power source, the one-way clutch 76 engages the flexible shaft and the accessory gearbox 25 to drive the accessory gearbox 25. This feature helps prevent the flexible shaft from getting too much wear as the turbine engine is operating. If the external power source turns the flexible shaft from the outside, the one-way clutch 76 engages and turns transmits torque to turn the rotor. If the turbine engine turns the accessory gearbox 25 and clutch from the inside, the one-way clutch 76 does not engage the flexible shaft and the accessory gearbox 25.

In one embodiment, after the gas turbine engine 10 is shut down, the ground crew connects the borescope motor unit 80 to the coupler 74 on the nacelle, so as to rotate the accessory gearbox 25 via the flexible shaft 70 and then rotate the rotor 30. The borescope motor unit 80 can also provide an intermittent rotary power or pulse power to intermittently turn the rotor 30. Comparing to the continuous rotary power, the intermittent rotary power can save overall power consumption.

The advantage of this technique is that rotor bow of the shaft 30 is reduced, Bowed Rotor Start (BRS) vibrations can be eliminated and the gas turbine engine 10 can be started faster without the need for extended air motoring. This technique allows the engine to meet customer design requirements to start the engine within a specified time, and protects engine performance and operability. This technique also eliminates the need for extended air motoring due to BRS, and does not require carrying turning gear on-engine and does not change or impact the current engine design. This technique is very simple and convenient to use for the ground crew.

The borescope motor unit 80 comprises a borescope motor 82 and a control unit 84. The borescope motor 82 provides a continuous rotary power or intermittent rotary or pulse power. The borescope motor 82 connects to the flexible shaft 70 directly or indirectly via a flexible shaft extension 86 and then transmit the rotary power to the accessory gearbox 25 via the connector 72 on the accessory gearbox 25 in order to turn the core of the accessory gearbox 25.

Referring to FIG. 2 of the drawings, the present disclosure also provides a system of reducing rotor bow of a turbine engine 10 comprising a flexible shaft 70 having a first end 702 connected with an accessory gearbox 25 of the turbine engine, and a second end 701 extending toward outside, e.g. to a nacelle 40 of the turbine; and an external power source 80 coupled to the flexible shaft 70 so as to drive the accessory gearbox 25 through the flexible shaft 70.

The flexible shaft 70 is connected to a connector 72 of the accessory gearbox 25. The connector 72 may be borescope pad on the accessory gearbox 25 or a point designed on the accessory gearbox 25 specifically for connecting the flexible shaft 70. The specific point would generally be used if this feature is preplanned. The borescope pad would usually be used if there is no specific point is predesigned. The flexible shaft 70 may connect directly to the connector 72 on the accessory gearbox 25 such as the borescope pad or the specific point mentioned above. In another embodiment, the Flexible shaft 70 connects to the connector 72 via a one-way clutch 76 as shown in FIG. 3.

In one embodiment, the flexible shaft 70 comprises a coupler 74 for being coupled to the external power source 80 by the ground crew. For convenient use of this technique, the coupler 74 is mounted on an outside surface of the nacelle 40. The coupler 74 is capable of being coupled to the external power source temporally by the ground crew, when aircraft is stopping at the gate. In another embodiment, the flexible shaft 70 has an end thereof extending to or outside the nacelle 40. In one example, the external power source 80 may directly couple to the flexible shaft 70 via the coupler 74 or one end of the flexible shaft 70. In another example, the external power source may have a length of flexible shaft extension 86 extended therefrom that can plug into the coupler 74 of the flexible shaft 70 or connect with one end of the flexible shaft 70, so as to rotate the flexible shaft 70.

The flexible shaft 70 comprises a flexible rotatable core and a bendable cover enveloping the flexible rotatable core, so as to transmit the rotary power from the external power source 80 to the accessory gearbox 25. The external power source 80 is borescope motor unit in an embodiment.

Therefore, the ground crew can conveniently couple the external power source, such as borescope motor to the flexible shaft 70 to drive the accessory gearbox 25 and to drive the rotor 30 of the turbine engine 10 to slow roll after the turbine engine is shut down, so as to reduce the rotor bow of the turbine engine 10.

Referring to FIG. 4 of the drawings, the present disclosure also provides a method 100 of reducing rotor bow of a turbine engine comprising steps of 110) connecting a flexible shaft to an accessory gearbox of the turbine engine; 120) extending the flexible shaft toward the outside of the turbine engine; 130) coupling an external power source to the flexible shaft; and 140) turning on the external power source to rotate the flexible shaft.

The step 110 of connecting a flexible shaft with an accessory gearbox of the turbine engine comprises connecting a flexible shaft with a connector of the accessory gearbox at a first end 702 thereof. The step 120 of extending the flexible shaft toward outside of the turbine engine comprises mounting a coupler connected with a second end 701 of the flexible shaft on an outer surface of the nacelle or extending a second end of the flexible shaft toward outside of the nacelle. The step of 130 of coupling an external power source to the flexible shaft comprises coupling the external power source directly to the flexible shaft or coupling a flexible shaft extension of the external power source to the flexible shaft. The method of reducing rotor bow of a turbine engine comprises step of 140 turning on the external power source to turn the flexible shaft so as to transmit rotary power to the accessory gearbox, so that the rotor of the turbine engine will be slow roll after the shutdown of the turbine engine so as to prevent rotor bow. The rotor can be turned continuously at a very slow rpm; or at a faster rpm; or periodically, and these can be controlled by controlling the external power source.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims.

What is claimed is:

1. A turbine engine, comprising:
    a core turbine engine comprising a turbine and a compressor adapted to be driven by the turbine via a rotor;
    an accessory gearbox connected with the rotor; and
    a flexible shaft having a first end connected with the accessory gearbox and a second end extending toward outside of the turbine engine for being selectively coupled to an external power source structure that is external to the turbine engine,
    wherein no gears are disposed between the accessory gearbox and the second end.

2. The turbine engine of claim 1, wherein the flexible shaft is connected to a connector of the accessory gearbox.

3. The turbine engine of claim 2, wherein the flexible shaft is connected to the connector of the accessory gearbox via a one-way clutch.

4. The turbine engine of claim 1, wherein the flexible shaft comprises a coupler for being selectively coupled to the external power source structure.

5. The turbine engine of claim 4, wherein the coupler is mounted on a nacelle.

6. The turbine engine of claim 1, wherein the external power source structure has a flexible shaft extension to couple with the flexible shaft.

7. The turbine engine of claim 1, wherein the external power source structure is a borescope motor.

8. A system for reducing rotor bow of a turbine engine, comprising:
    a flexible shaft having a first end connected with an accessory gearbox of the turbine engine, and a second end extending toward outside of the turbine engine; and
    an external power source structure that is external to the turbine engine selectively coupled to the flexible shaft so as to drive the accessory gearbox through the flexible shaft, wherein no gears are disposed between the accessory gearbox and the external power source structure.

9. The system for reducing rotor bow of a turbine engine of claim 8, wherein the flexible shaft is connected to a connector of the accessory gearbox.

10. The system for reducing rotor bow of a turbine engine of claim 9, wherein the flexible shaft is connected to the connector of the accessory gearbox via a one-way clutch.

11. The system for reducing rotor bow of a turbine engine of claim 8, wherein the flexible shaft comprises a coupler for being selectively coupled to the external power source structure.

12. The system for reducing rotor bow of a turbine engine of claim 11, wherein the coupler is mounted on a nacelle.

13. The system for reducing rotor bow of a turbine engine of claim 8, wherein the external power source structure has a flexible shaft extension to couple with the flexible shaft.

14. The system for reducing rotor bow of a turbine engine of claim 8, wherein the external power source structure is a borescope motor.

15. A method of reducing rotor bow of a turbine engine, comprising:
    connecting a flexible shaft to an accessory gearbox of the turbine engine;
    extending the flexible shaft toward the outside of the turbine engine;
    selectively coupling an external power source structure that is external to the turbine engine to the flexible shaft without any gears between the external power source structure and the accessory gearbox after shutdown of the gas turbine engine; and
    turning on the external power source structure to rotate the flexible shaft.

16. The method of reducing rotor bow of a turbine engine of claim 15, wherein connecting the flexible shaft with the accessory gearbox of the turbine engine comprises connecting the flexible shaft with a connector of the accessory gearbox at a first end thereof.

17. The method of reducing rotor bow of a turbine engine of claim 16, wherein connecting the flexible shaft with the accessory gearbox of the turbine engine comprises connecting the flexible shaft with the connector of the accessory gearbox via a one-way clutch.

18. The method of reducing rotor bow of a turbine engine of claim 15, wherein extending the flexible shaft toward outside of the turbine engine comprises mounting a coupler at a second end of the flexible shaft on a nacelle.

19. The method of reducing rotor bow of a turbine engine of claim 15, wherein selectively coupling the external power source structure to the flexible shaft comprises selectively coupling a flexible shaft extension of the external power source structure to the flexible shaft.

20. The method of reducing rotor bow of a turbine engine of claim 15, wherein the turning on the external power source structure to rotate the flexible shaft comprises continuously rotating the flexible shaft.

* * * * *